US010762387B2

(12) United States Patent
Hu et al.

(10) Patent No.: US 10,762,387 B2
(45) Date of Patent: Sep. 1, 2020

(54) METHOD AND APPARATUS FOR PROCESSING IMAGE

(71) Applicant: Baidu Online Network Technology (Beijing) Co., Ltd ., Beijing (CN)

(72) Inventors: Yang Hu, Beijing (CN); Shilei Wen, Beijing (CN); Xiao Liu, Beijing (CN); Xubin Li, Beijing (CN); Errui Ding, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 130 days.

(21) Appl. No.: 16/134,055

(22) Filed: Sep. 18, 2018

(65) Prior Publication Data

US 2019/0188530 A1     Jun. 20, 2019

(30) Foreign Application Priority Data

Dec. 20, 2017   (CN) .......................... 2017 1 1387870

(51) Int. Cl.
*G06K 9/46*         (2006.01)
*G06K 9/62*         (2006.01)
(Continued)

(52) U.S. Cl.
CPC ......... *G06K 9/6229* (2013.01); *G06K 9/4604* (2013.01); *G06K 9/4628* (2013.01);
(Continued)

(58) Field of Classification Search
CPC .. G06K 9/6229; G06K 9/4604; G06K 9/4628; G06K 9/4671; G06K 9/6211; G06K 9/6256; G06K 9/6262; G06K 9/627; G06K 9/6274; G06T 7/73; G06T 2207/20081; G06T 2207/20084
See application file for complete search history.

(56) References Cited

U.S. PATENT DOCUMENTS

| 10,423,827 B1* | 9/2019 | Wu .......................... G06K 9/66 |
| 2005/0117033 A1* | 6/2005 | Matsui .................. G01S 3/7864 348/239 |

(Continued)

FOREIGN PATENT DOCUMENTS

| CN | 105469087 A | 4/2016 |
| CN | 106651825 A | 5/2017 |
| CN | 106780612 A | 5/2017 |

*Primary Examiner* — Dominic E Rego
(74) *Attorney, Agent, or Firm* — Seed IP Law Group LLP (57) ABSTRACT

Embodiments of the present disclosure disclose a method and an apparatus for processing an image. A specific embodiment of the method includes: acquiring a target image including a polygon image; inputting the target image into a pre-trained convolutional neural network to obtain a characteristic vector of the target image, the convolutional neural network being used to represent a correspondence relationship between an image and a characteristic vector, and the characteristic vector being a vector including a category feature, a position feature, and a keypoint feature of the polygon image; and recognizing an image area of the polygon image based on the category feature, the position feature, and the keypoint feature. This embodiment improves the accuracy of polygon image recognition.

17 Claims, 6 Drawing Sheets

(51) Int. Cl.
G06T 7/62 (2017.01)
G06T 7/73 (2017.01)

(52) U.S. Cl.
CPC ........... G06K 9/4671 (2013.01); G06K 9/627 (2013.01); G06K 9/6211 (2013.01); G06K 9/6256 (2013.01); G06K 9/6262 (2013.01); G06K 9/6274 (2013.01); G06T 7/73 (2017.01); G06T 2207/20081 (2013.01); G06T 2207/20084 (2013.01)

(56) References Cited

U.S. PATENT DOCUMENTS

| | | | |
|---|---|---|---|
| 2012/0201423 A1* | 8/2012 | Onai | H04N 1/3878 382/103 |
| 2013/0127827 A1* | 5/2013 | Shiell | G06T 15/205 345/419 |
| 2014/0153832 A1* | 6/2014 | Kwatra | G06T 11/00 382/195 |
| 2016/0029927 A1* | 2/2016 | Finkelstein | A61B 5/1075 382/132 |
| 2017/0083796 A1* | 3/2017 | Kim | G06K 9/00805 |
| 2018/0075508 A1* | 3/2018 | Hewavitharana | G06F 40/58 |
| 2018/0096481 A1* | 4/2018 | Schwartz | G06T 7/194 |
| 2018/0114084 A1 | 4/2018 | Meng et al. | |
| 2018/0189604 A1* | 7/2018 | Zhang | G06N 3/0454 |

\* cited by examiner

METHOD AND APPARATUS FOR PROCESSING IMAGE

CROSS-REFERENCE TO RELATED APPLICATIONS

This application claims priority to Chinese Patent Application No. 201711387870.9, filed on Dec. 20, 2017, titled "Method and Apparatus for Processing Image," which is hereby incorporated by reference in its entirety.

TECHNICAL FIELD

Embodiments of the present disclosure relate to the field of computer technology, specifically relate to the field of Internet technology, and more specifically relate to a method and an apparatus for processing an image.

BACKGROUND

At present, in the field of image processing and video frame processing, polygon detection technology is a technology widely studied. In general, polygon detection is one of the important steps in image processing such as image recognition analysis. Based on the detected polygon area, information such as a preset text or image is inserted into the detected polygon area, so that information replacement may be realized, and manual operations are reduced. In addition, polygon detection technology may also be applied to fields such as surveillance and image correction.

SUMMARY

The objective of embodiments of the present disclosure includes providing a method and an apparatus for processing an image.

In a first aspect, the embodiments of the present disclosure provide a method for processing an image, including: acquiring a target image including a polygon image; inputting the target image into a pre-trained convolutional neural network to obtain a characteristic vector of the target image, the convolutional neural network being used to represent a correspondence relationship between an image and a characteristic vector, and the characteristic vector being a vector including a category feature, a position feature, and a keypoint feature of the polygon image; and recognizing an image area of the polygon image based on the category feature, the position feature, and the keypoint feature.

In some embodiments, the recognizing an image area of the polygon image based on the category feature, the position feature, and the keypoint feature, includes: inputting the category feature into a pre-trained classification model to obtain a category of the polygon image, where the classification model is used to represent a correspondence relationship between the category feature and the category of the polygon image.

In some embodiments, the recognizing an image area of the polygon image based on the category feature, the position feature, and the keypoint feature includes: inputting the position feature into a pre-trained positioning model to obtain a position of the polygon image, where the positioning model is used to represent a correspondence relationship between the position feature and the position of the polygon image.

In some embodiments, the recognizing an image area of the polygon image based on the category feature, the position feature, and the keypoint feature includes: inputting the keypoint feature into a pre-trained keypoint model to obtain keypoint information of the polygon image, where the keypoint model is used to represent a correspondence relationship between the keypoint feature and the keypoint information of the polygon image.

In some embodiments, the recognizing an image area of the polygon image based on the category feature, the position feature, and the keypoint feature includes: determining a predicted minimum enclosing rectangle of the polygon image included in the target image; and performing a sliding operation of the predicted minimum enclosing rectangle on the target image according to a preset trajectory to determine, on the target image, the image area of the polygon image matching the category feature, the position feature, and the keypoint feature.

In some embodiments, the convolutional neural network is obtained by training, the training including: acquiring a training sample set, where a training sample includes an image and a characteristic vector of the image; and using, for each training sample in the training sample set, the image included in the training sample as an input, and the characteristic vector of the image included in the training sample as an output to obtain the convolutional neural network by training using a machine learning method.

In some embodiments, the method further includes: determining a recognition accuracy of the image area; and determining the characteristic vector of the image including the image area and the image including the image area as training samples to continue training the convolutional neural network, in response to determining that the recognition accuracy being greater than a preset threshold.

In some embodiments, the method further includes: adjusting a parameter of at least one of the convolutional neural network, the classification model, the positioning model, and the keypoint model, in response to determining that the accuracy being not greater than the preset threshold.

In a second aspect, the embodiments of the present disclosure provide an apparatus for processing an image, including: an acquisition unit, configured to acquire a target image including a polygon image; an input unit, configured to input the target image into a pre-trained convolutional neural network to obtain a characteristic vector of the target image, the convolutional neural network being used to represent a correspondence relationship between an image and a characteristic vector, and the characteristic vector being a vector including a category feature, a position feature, and a keypoint feature of the polygon image; and a recognition unit, configured to recognize an image area of the polygon image based on the category feature, the position feature, and the keypoint feature.

In some embodiments, the recognition unit includes: a first input module, configured to input the category feature into a pre-trained classification model to obtain a category of the polygon image, where the classification model is used to represent a correspondence relationship between the category feature and the category of the polygon image.

In some embodiments, the recognition unit includes: a second input module, configured to input the position feature into a pre-trained positioning model to obtain a position of the polygon image, where the positioning model is used to represent a correspondence relationship between the position feature and the position of the polygon image.

In some embodiments, the recognition unit includes: a third input unit, configured to input the keypoint feature into a pre-trained keypoint model to obtain keypoint information of the polygon image, where the keypoint model is used to represent a correspondence relationship between the keypoint feature and the keypoint information of the polygon image.

In some embodiments, the recognition unit includes: a first determination module, configured to determine a predicted minimum enclosing rectangle of the polygon image included in the target image; and a second determination module, configured to perform a sliding operation of the predicted minimum enclosing rectangle on the target image according to a preset trajectory to determine, on the target image, the image area of the polygon image matching the category feature, the position feature, and the keypoint feature.

In some embodiments, the convolutional neural network is obtained by training, the training including: acquiring a training sample set, where a training sample includes an image and a characteristic vector of the image; and using, for each training sample in the training sample set, the image included in the training sample as an input, and the characteristic vector of the image included in the training sample as an output to obtain the convolutional neural network by training using a machine learning method.

In some embodiments, the apparatus further includes: a determination unit, configured to determine a recognition accuracy of the image area; and a training unit, configured to determine the characteristic vector of the image including the image area and the image including the image area as training samples to continue training the convolutional neural network, in response to determining that the recognition accuracy being greater than a preset threshold.

In some embodiments, the apparatus further includes: an adjusting unit, configured to adjust a parameter of at least one of the convolutional neural network, the classification model, the positioning model, and the keypoint model, in response to determining that the accuracy being not greater than the preset threshold.

In a third aspect, the embodiments of the present disclosure provide a server for processing an image, including: one or more processors; and a storage apparatus, for storing one or more programs, the one or more programs, when executed by the one or more processors, cause the one or more processors to implement the method for processing an image according to any one of the embodiments.

In a fourth aspect, the embodiments of the present disclosure provide a computer readable storage medium for processing an image, storing a computer program thereon, the program, when executed by a processor, implements the method for processing an image according to any one of the embodiments.

By acquiring a target image including a polygon image; then inputting the target image into a pre-trained convolutional neural network to obtain a characteristic vector of the target image, the convolutional neural network being used to represent a correspondence relationship between an image and a characteristic vector, and the characteristic vector being a vector including a category feature, a position feature, and a keypoint feature of the polygon image; and then recognizing an image area of the polygon image based on the category feature, the position feature, and the keypoint feature, the method and apparatus for processing an image according to the embodiments of the present disclosure effectively utilizes the characteristic vector of the image, and improves the accuracy of polygon image recognition.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
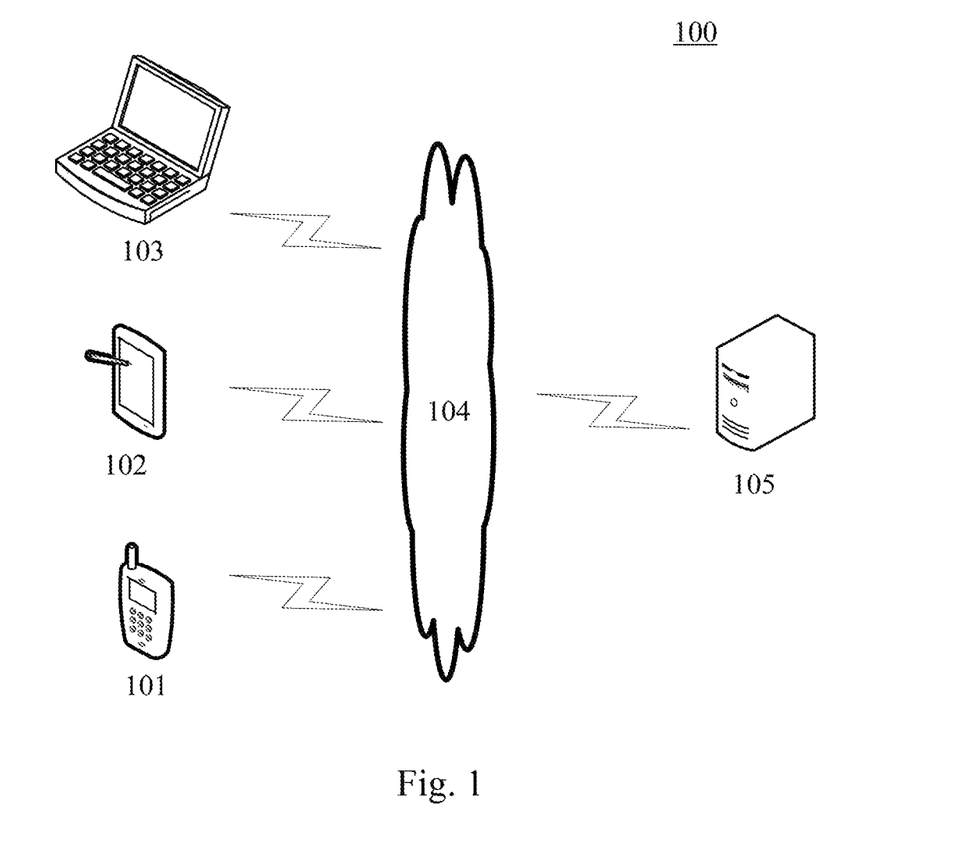
FIG. 1 is an exemplary system architecture diagram to which the present disclosure may be applied.

FIG. 1 shows an exemplary architecture of a system 100 in which a method for processing an image or an apparatus for processing an image according to the embodiments of the present disclosure may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as image processing applications, webpage browser applications, shopping applications, search applications, instant messaging tools, mailbox clients, and social platform software may be installed on the terminal devices 101, 102 and 103.

The terminal devices 101, 102 and 103 may be various electronic devices having display screens and supporting webpage browsing, including but not limited to, smart phones, tablet computers, laptop computers and desktop computers.

The server 105 may be a server providing various services, for example, a backend image processing server providing support to the images uploaded by the terminal devices 101, 102 or 103. The backend image processing server may perform a processing such as extracting a characteristic vector of data such as received images, and return a processing result (for example, information about polygon image included in the image) to the terminal devices.

It should be noted that the method for processing an image according to the embodiments of the present disclosure is generally executed by the server 105. Accordingly, the apparatus for processing image is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
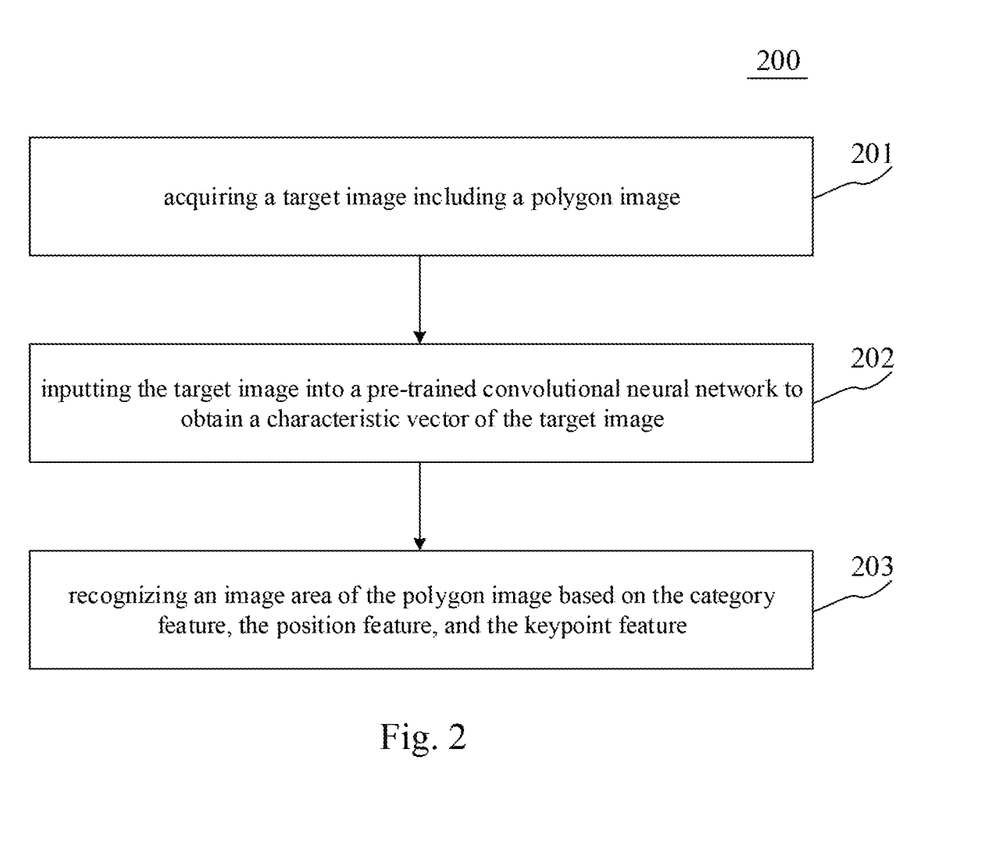
FIG. 2 is a flowchart of an embodiment of a method for processing an image according to the present disclosure.

With further reference to FIG. 2, a flow 200 of a method for processing an image according to an embodiment of the present disclosure is illustrated. The method for processing an image includes steps 201 to 203.

Step 201 includes acquiring a target image including a polygon image.

In the present embodiment, the electronic device (e.g., the server as shown in FIG. 1) on which the method for processing an image is implemented may acquire the target image including the polygon image through a wired connection or a wireless connection. Here, the target image may be an image pre-stored in the electronic device; or may be an image transmitted by a terminal device (e.g., the terminal device as shown in FIG. 1). The polygon image includes, but is not limited to, at least one of: a triangle, a diamond, a rectangle, a pentagon, and a hexagon.

Step 202 includes inputting the target image into a pre-trained convolutional neural network to obtain a characteristic vector of the target image.

In the present embodiment, the electronic device may input the target image obtained in step 201 into the pre-trained convolutional neural network to obtain the characteristic vector of the target image. Here, the convolutional neural network is used to represent a correspondence relationship between an image and a characteristic vector. The characteristic vector is a vector including a category feature, a position feature, and a keypoint feature of the polygon image. The category feature may be data for distinguishing the category of the polygon image (such as triangle category, and quadrilateral category). The position feature may be data for representing the position of the polygon image (e.g., the position of the edge, the position of the vertex, the position of the pixel point inside the polygon image and the like). The keypoint feature may be data for representing the feature of the keypoint of the polygon image (e.g., the coordinates of the vertices, the number of the vertices and the like).

As an example, the convolutional neural network may be a correspondence table storing correspondence relationships between a plurality of images and characteristic vectors, pre-defined by a skilled person based on statistics on a large number of images and characteristic vectors; or the convolutional neural network may be a database storing the plurality of images, the characteristic vectors and a correspondence relationship therebetween, preset by a skilled person based on statistics on a large number of data. It may be understood that the convolutional neural network may include basic units such as a convolution layer and a pooling layer. The composition and quantity of the basic unit may be dynamically adjusted by the skilled person according to actual needs.

It should be noted that in the field of image processing, the technology for extracting the characteristic vector of the image is a well-known technology widely studied by those skilled in the relevant art, and details description thereof will be omitted.

Step 203 includes recognizing an image area of the polygon image based on the category feature, the position feature, and the keypoint feature.

In the present embodiment, the electronic device may recognize the image area of the polygon image based on the category feature, the position feature, and the keypoint feature obtained in step 202. Here, the image area may be an area formed by pixel points or edges of the polygon image in the target image. The image area of the polygon image may include vertices, edges, and internal pixel points of the polygon image.

Figure 3:
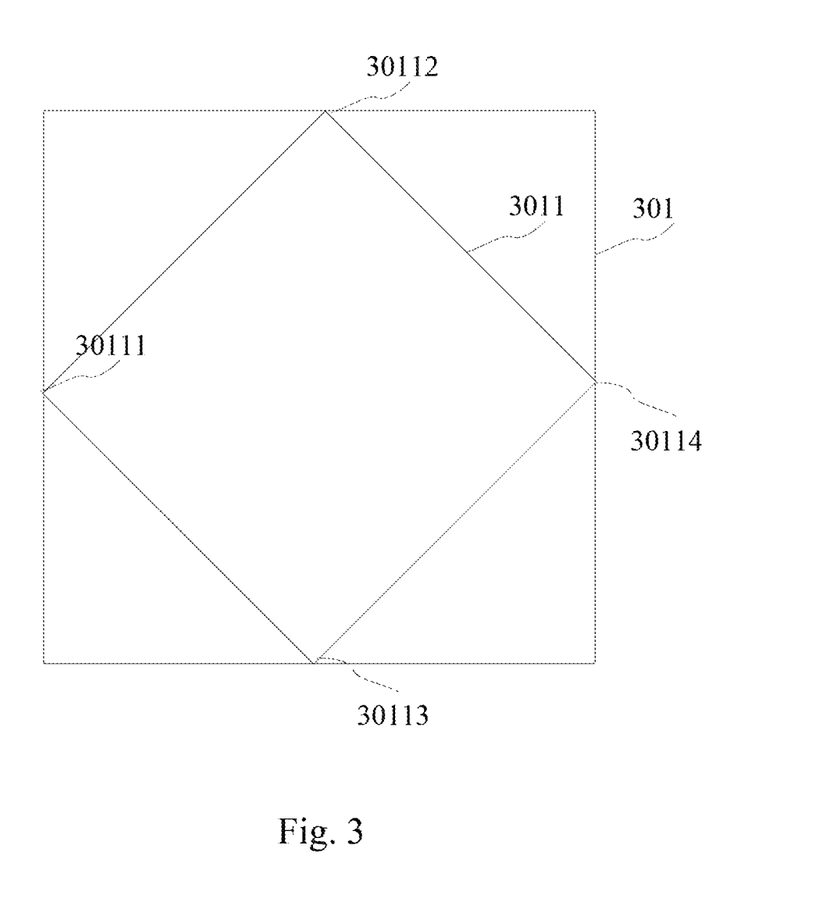
FIG. 3 is a schematic diagram of an application scenario of a method for processing an image according to the present disclosure.

Exemplarily, if the electronic device determines that the keypoint feature indicates the polygon image having four vertices, and can determine the position of the four vertices in the target image, the image area of the polygon image is a quadrilateral area having the above four vertices as vertices. Then, the electronic device may determine a matching degree of the quadrilateral area with the category feature and the position feature, thereby recognizing the final image area of the polygon image. It may be understood that the electronic device may first determine the quadrilateral area based on the position feature (for example, the position feature of each edge), and then determine the matching degree of the quadrilateral area with the category feature and the keypoint feature, thereby recognizing the final image area of the polygon image. As an example, referring to FIG. 3, in FIG. 3, the category feature obtained by the electronic device indicates that the polygon image is a quadrilateral, the position feature indicates that the polygon image is in the middle of the target image 301, and the keypoint feature indicates that the four vertices 30111, 30112, 30113, 30114 of the quadrilateral are located on the midpoints of the four edges of the target image 301. Then, the electronic device may determine the area of the quadrilateral 3011 as the recognized image area of the polygon image.

In some alternative implementations of the present embodiment, the recognizing an image area of the polygon image based on the category feature, the position feature, and the keypoint feature includes: inputting the category feature into a pre-trained classification model to obtain a category of the polygon image. Here, the classification model is used to represent a correspondence relationship between the category feature and the category of the polygon image. The category may be information for representing a category of the polygon image. Exemplarily, the category may be "triangle category", "quadrilateral category", and the like. The classification model may be a correspondence table storing correspondence relationships between a plurality of category features and categories, pre-defined by a skilled person based on statistics on a large number of category features and categories; or the classification model may be a database storing the plurality of category features, categories and correspondence relationships therebetween, preset by a skilled person based on statistics on a large number of data.

Here, the classification model may be obtained by training as follows.

First, the electronic device may acquire a training sample set. Here, a training sample includes a category feature and a category corresponding to the category feature. The training sample may be pre-stored in the electronic device, or may be acquired from another electronic device (such as the terminal device shown in FIG. 1) by the electronic device.

Then, the electronic device may use, for each training sample in the training sample set, a deep neural network model as an initial model, the category feature included in the training sample as an input, and the category included in the training sample as an output to obtain the classification model by training using a machine learning algorithm.

In some alternative implementations of the present embodiment, the recognizing an image area of the polygon image based on the category feature, the position feature, and the keypoint feature includes: inputting the position feature into a pre-trained positioning model to obtain a position of the polygon image. Here, the positioning model is used to represent a correspondence relationship between the position feature and the position of the polygon image. The position may be information for representing a position of the polygon image. Exemplarily, the position may be the coordinate "(0,0)", representing a pixel point (e.g., a vertex) of the polygon image at the origin of the preset coordinate system (for example, a coordinate system using a given vertex of the target image as the origin, two edges where the given vertex is located as the horizontal axis and the vertical axis, and the directions from the given vertex to the two vertices closest to the give vertex among the four vertices of the target image as the positive directions, and 10 pixels as a unit length). The positioning model may be a correspondence table storing correspondence relationships between a plurality of position features and positions, pre-defined by a skilled person based on statistics on a large number of position features and positions; or the position model may be a database storing the plurality of position features, positions and correspondence relationships therebetween, preset by a skilled person based on statistics on a large number of data.

Here, the positioning model may be obtained by training as follows.

First, the electronic device may acquire a training sample set. Here, a training sample includes a position feature and a position corresponding to the position feature. The training sample may be pre-stored in the electronic device, or may be acquired from another electronic device (such as the terminal device shown in FIG. 1) by the electronic device.

Then, the electronic device may use, for each training sample in the training sample set, a deep neural network model as an initial model, the position feature included in the training sample as an input, and the position included in the training sample as an output to obtain the positioning model by training using a machine learning algorithm.

In some alternative implementations of the present embodiment, the recognizing an image area of the polygon image based on the category feature, the position feature, and the keypoint feature, includes: inputting the keypoint feature into a pre-trained keypoint model to obtain keypoint information of the polygon image. Here, the keypoint model is used to represent a correspondence relationship between the keypoint feature and the keypoint information of the polygon image. The keypoint information may be information for representing the number, position, and the like of the keypoint of the polygon image. Exemplarily, the keypoint information may be "the number of vertices: five", "vertex position: midpoint of the diagonal of the target image" and the like. The keypoint model may be a correspondence table storing correspondence relationships between a plurality of keypoint features and keypoint information, pre-defined by a skilled person based on statistics on a large number of keypoint features and keypoint information; or the keypoint model may be a database storing the plurality of keypoint features, keypoint information and correspondence relationships therebetween, preset by a skilled person based on statistics on a large number of data.

Here, the keypoint model may be obtained by training as follows.

First, the electronic device may acquire a training sample set. Here, a training sample includes a keypoint feature and keypoint information corresponding to the keypoint feature. The training sample may be pre-stored in the electronic device, or may be acquired from another electronic device (such as the terminal device shown in FIG. 1) by the electronic device.

Then, the electronic device may use, for each training sample in the training sample set, a deep neural network model as an initial model, the keypoint feature included in the training sample as an input, and the keypoint information included in the training sample as an output to obtain the keypoint model by training using a machine learning algorithm.

In some alternative implementations of the present embodiment, the recognizing an image area of the polygon image based on the category feature, the position feature, and the keypoint feature, includes: determining a predicted minimum enclosing rectangle of the polygon image included in the target image; and performing a sliding operation of the predicted minimum enclosing rectangle on the target image according to a preset trajectory to determine, on the target image, the image area of the polygon image matching the category feature, the position feature, and the keypoint feature. Here, the predicted minimum enclosing rectangle may be a rectangle predicted by the electronic device based on the category feature, the position feature, and the keypoint feature. The preset trajectory is a trajectory preset by a skilled person as required. Exemplarily, the predicted minimum enclosing rectangle may be determined by a rotation method, a best fit straight line algorithm. The preset trajectory may be a trajectory spirally extended from the center of gravity of the target image to the periphery of the target image; or may be a number of parallel line segments located on the target image and parallel to a certain edge of the target image. Then, the electronic device may perform a sliding operation of the predicted minimum enclosing rectangle on the target image, and determine whether the predicted minimum enclosing rectangle has an image area of the polygon image matching the category feature, the position feature, and the keypoint feature in the area included by the target image. It may be understood that the above method for determining the image area of the polygon image by using the predicted minimum enclosing rectangle may further improve the accuracy of polygon image recognition.

The method according to the embodiments of the present disclosure includes acquiring a target image including a polygon image; then inputting the target image into a pre-trained convolutional neural network to obtain a characteristic vector of the target image, the convolutional neural network being used to represent a correspondence relationship between an image and a characteristic vector, and the characteristic vector being a vector including a category feature, a position feature, and a keypoint feature of the polygon image; and then recognizing an image area of the polygon image based on the category feature, the position feature, and the keypoint feature. With the method according to the embodiment of the disclosure, the accuracy of polygon image recognition is improved.

Figure 4:
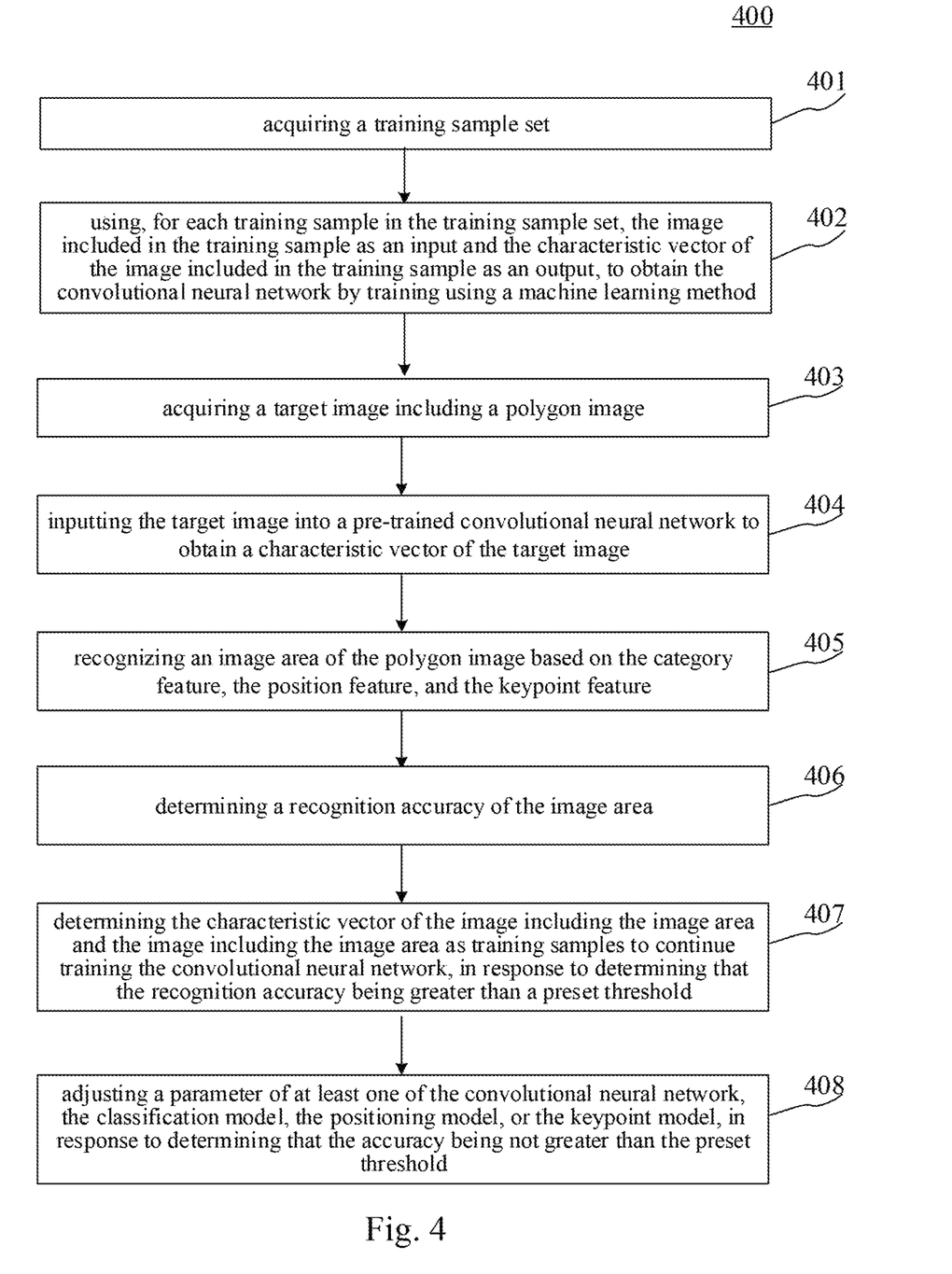
FIG. 4 is a flowchart of another embodiment of the method for processing an image according to the present disclosure.

With further reference to FIG. 4, a flow 400 of a method for processing an image according to another embodiment is illustrated. The flow 400 of the method for processing an image includes steps 401 to 408.

Step 401 includes acquiring a training sample set.

In the present embodiment, the electronic device (e.g., the server as shown in FIG. 1) on which the method for processing an image is implemented may acquire a training sample set through a wired connection or a wireless connection. Here, a training sample includes an image and a characteristic vector of the image. The training sample may be pre-stored in the electronic device, or may be acquired from another electronic device (such as the terminal device shown in FIG. 1) by the electronic device.

Step 402 includes using, for each training sample in the training sample set, the image included in the training sample as an input, and the characteristic vector of the image included in the training sample as an output to obtain the convolutional neural network by training using a machine learning method.

In the present embodiment, the electronic device may use, for each training sample in the training sample set, the image included in the training sample as an input, and the characteristic vector of the image included in the training sample as an output to obtain the convolutional neural network by training using a machine learning method. The machine learning algorithm includes, but is not limited to, a gradient descent algorithm, a neural network algorithm, and a back propagation algorithm.

It should be noted that the image included in the training sample set may be an image being blocked, and images included in the training sample set may include polygon images having a significant difference in size (for example, the area of the polygon image included in a certain image is 100 times of the area of the polygon image included in another image). Thereby, the electronic device can recognize a polygon image included in the blocked image and polygon images having a significant difference in size.

Step 403 includes acquiring a target image including a polygon image.

In the present embodiment, step 403 is substantially the same as step 201 in the corresponding embodiment of FIG. 2, and detailed description thereof will be omitted.

Step 404 includes inputting the target image into a pre-trained convolutional neural network to obtain a characteristic vector of the target image.

In the present embodiment, the electronic device may input the target image into the convolutional neural network trained and obtained in step 402 to obtain the characteristic vector of the target image. Here, step 404 is substantially the same as step 202 in the corresponding embodiment of FIG. 2, and detailed description thereof will be omitted.

Step 405 includes recognizing an image area of the polygon image based on the category feature, the position feature, and the keypoint feature.

In the present embodiment, step 405 is substantially the same as step 203 in the corresponding embodiment of FIG. 2, and detailed description thereof will be omitted.

Step 406 includes determining a recognition accuracy of the image area.

In the present embodiment, the electronic device may determine the recognition accuracy of the image area.

In some alternative implementations of the present embodiment, a skilled person may first set a test sample set. Here, a test sample includes an image (an image including the polygon image), and an image area of the polygon image included in the image. Then, for each test sample in the test sample set, the image area of the polygon image included in the image included in the test sample is determined according to the above steps 403 to 405. The recognized image area is then compared with the image area included in the test sample set to determine the recognition accuracy of the image area. Exemplarily, if 50% of the image area in the recognized image area is the same as the image area included in the test sample set, and the other 50% image area is different from the image area included in the test sample set, the recognition accuracy of the image area may be determined to be 50%.

In some alternative implementations of the present embodiment, the electronic device may send a large number of recognized image areas to the terminal device, and then the user of the terminal device determines whether each image area is accurate, thereby determining the recognition accuracy of the image area.

Step 407 includes using the characteristic vector of the image including the image area and the image including the image area as training samples to continue training the convolutional neural network, in response to determining that the recognition accuracy being greater than a preset threshold.

In the present embodiment, the electronic device may determine the characteristic vector of the image including the image area and the image including the image area as training samples to continue training the convolutional neural network, in response to determining that the recognition accuracy being greater than the preset threshold (for example, 80%).

It may be understood that using the image set and the characteristic vector set corresponding to the recognition accuracy greater than the preset threshold as the training sample set and continuing to train the convolutional neural network may help improve the recognition accuracy of the image area.

Step 408 includes adjusting a parameter of at least one of the convolutional neural network, the classification model, the positioning model, and the keypoint model, in response to determining that the accuracy being not greater than the preset threshold.

In the present embodiment, in response to determining that the accuracy being not greater than the preset threshold (for example, 70%), the electronic device may adjust the parameter of at least one of the convolutional neural network, the classification model, the positioning model, and the keypoint model. It may be understood that by adjusting the parameter of the model, it may be helpful to improve the recognition accuracy of the image area.

As can be seen from FIG. 4, the flow 400 of the method for processing an image in the present embodiment highlights the step of training the convolutional neural network and the step of adjusting the training parameter of the model based on the recognition accuracy as compared with the corresponding embodiment of FIG. 2. Thus, the solution described by the present embodiment may introduce more model training schemes, thereby further improving the accuracy of polygon image recognition.

Figure 5:
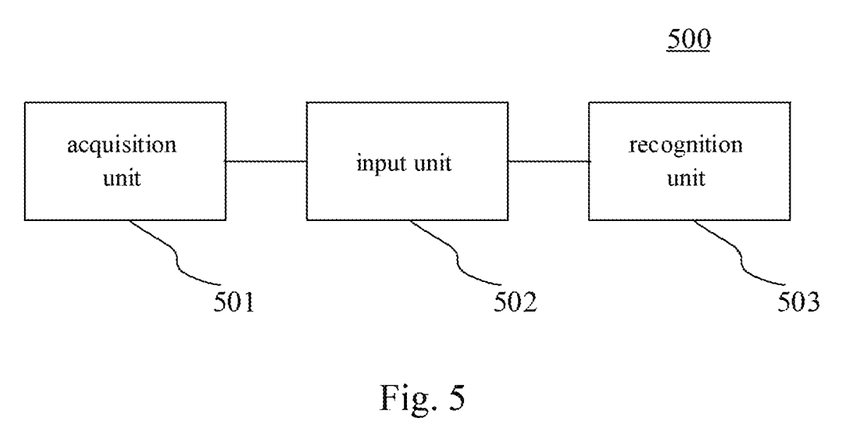
FIG. 5 is a schematic structural diagram of an embodiment of an apparatus for processing an image according to the present disclosure.

With further reference to FIG. 5, as an implementation to the method shown in the above figures, the present disclosure provides an embodiment of an apparatus for processing an image. The apparatus embodiment corresponds to the method embodiment shown in FIG. 2, and the apparatus may specifically be applied to various electronic devices.

As shown in FIG. 5, the apparatus 500 for processing an image of the present embodiment includes: an acquisition unit 501, an input unit 502 and a recognition unit 503. The acquisition unit 501 is configured to acquire a target image including a polygon image. The input unit 502 is configured to input the target image into a pre-trained convolutional neural network to obtain a characteristic vector of the target image, the convolutional neural network being used to represent a correspondence relationship between an image and a characteristic vector, and the characteristic vector being a vector including a category feature, a position feature, and a keypoint feature of the polygon image. The recognition unit 503 is configured to recognize an image area of the polygon image based on the category feature, the position feature, and the keypoint feature.

In the present embodiment, the acquisition unit 501 of the apparatus 500 for processing an image may acquire the target image including the polygon image through a wired connection or a wireless connection. Here, the target image may be an image pre-stored in the electronic device; or may be an image transmitted by a terminal device (e.g., the terminal devices 101, 102, 103 as shown in FIG. 1).

In the present embodiment, based on the target image acquired by the acquisition unit 501, the input unit 502 may input the target image obtained in the acquisition unit 501 into the pre-trained convolutional neural network to obtain the characteristic vector of the target image. Here, the convolutional neural network is used to represent a correspondence relationship between an image and a characteristic vector. The characteristic vector is a vector including the category feature, the position feature, and the keypoint feature of the polygon image. The category feature may be data for distinguishing the category of the polygon image (such as triangle category, and quadrilateral category). The position feature may be data for representing the position of the polygon image (e.g., the position of the edge, the position of the vertex, the position of the pixel point inside the polygon image and the like). The keypoint feature may be data for representing the feature of the keypoint of the polygon image (e.g., the coordinates of the vertices, the number of the vertices and the like).

In the present embodiment, the recognition unit 503 may recognize an image area of the polygon image based on the category feature, the position feature, and the keypoint feature obtained by the input unit 502. Here, the image area may be an area formed by the pixel points or edges of the polygon image in the target image.

In some alternative implementations of the present embodiment, the recognition unit includes: a first input module (not shown in the figure), configured to input the category feature into a pre-trained classification model to obtain a category of the polygon image. Here, the classification model is used to represent a correspondence relationship between the category feature and the category of the polygon image. The category may be information for representing a category of the polygon image. Exemplarily, the category may be "triangle category", "quadrilateral category", and the like. The classification model may be a correspondence table storing correspondence relationships between a plurality of category features and categories, pre-defined by a skilled person based on statistics on a large number of category features and categories; or may be a database storing the plurality of category features, features and correspondence relationships therebetween, preset by a skilled person based on statistics on a large number of data.

In some alternative implementations of the present embodiment, the recognition unit includes: a second input module (not shown in the figure), configured to input the position feature into a pre-trained positioning model to obtain a position of the polygon image. Here, the positioning model is used to represent a correspondence relationship between the position feature and the position of the polygon image. The position may be information for representing a position of the polygon image. Exemplarily, the position may be the coordinate "(0,0)", representing a pixel point (e.g., a vertex) of the polygon image at the origin of the preset coordinate system (for example, a coordinate system using a given vertex of the target image as the origin, two edges where the given vertex is located as the horizontal axis and the vertical axis, and the directions from the given vertex to the two vertices closest to the give vertex among the four vertices of the target image as the positive directions, and 10 pixels as a unit length). The positioning model may be a correspondence table storing correspondence relationships between a plurality of position features and positions, pre-defined by a skilled person based on statistics on a large number of position features and positions; or may be a database storing the plurality of position features and positions and their correspondence relationships, preset by a skilled person based on statistics on a large number of data.

In some alternative implementations of the present embodiment, the recognition unit includes: a third input unit (not shown in the figure), configured to input the keypoint feature into a pre-trained keypoint model to obtain keypoint information of the polygon image. Here, the keypoint model is used to represent a correspondence relationship between the keypoint feature and the keypoint information of the polygon image. The keypoint information may be information for representing the number, position, and the like of the keypoint of the polygon image. Exemplarily, the keypoint information may be "the number of vertices: five", "vertex position: midpoint of the diagonal of the target image" and the like. The keypoint model may be a correspondence table storing correspondence relationships between a plurality of keypoint features and keypoint information, pre-defined by a skilled person based on statistics on a large number of keypoint features and keypoint information; or may be a database storing the plurality of keypoint features, keypoint information and correspondence relationships therebetween, preset by a skilled person based on statistics on a large number of data.

In some alternative implementations of the present embodiment, the recognition unit includes: a first determination module (not shown in the figure), configured to determine a predicted minimum enclosing rectangle of the polygon image included in the target image; and a second determination module (not shown in the figure), configured to perform a sliding operation of the predicted minimum enclosing rectangle on the target image according to a preset trajectory to determine, on the target image, the image area of the polygon image matching the category feature, the position feature, and the keypoint feature. Here, the predicted minimum enclosing rectangle may be a rectangle predicted by the electronic device based on the category feature, the position feature, and the keypoint feature. The preset trajectory is a trajectory preset by a skilled person as required.

In some alternative implementations of the present embodiment, the convolutional neural network is obtained by following training: acquiring a training sample set, where a training sample includes an image and a characteristic vector of the image; and using, for each training sample in the training sample set, the image included in the training sample as an input, and the characteristic vector of the image included in the training sample as an output to obtain the convolutional neural network by training using a machine learning method. The training sample may be pre-stored in the electronic device, or may be acquired from another electronic device (such as the terminal device shown in FIG. 1) by the electronic device. The machine learning algorithm includes, but is not limited to, a gradient descent algorithm, a neural network algorithm, and a back propagation algorithm.

In some alternative implementations of the present embodiment, the apparatus further includes: a determination unit (not shown in the figure), configured to determine a recognition accuracy of the image area; and a training unit, configured to use the characteristic vector of the image including the image area and the image including the image area as training samples to continue training the convolutional neural network, in response to determining that the recognition accuracy being greater than a preset threshold.

In some alternative implementations of the present embodiment, a skilled person may first set a test sample set. Here, a test sample includes an image (an image including the polygon image), and an image area of the polygon image included in the image. Then, for each test sample in the test sample set, the image area of the polygon image included in the image included in the test sample is determined according to the above steps 403 to 405. The recognized image area is then compared with the image area included in the test sample set to determine the recognition accuracy of the image area. Exemplarily, if 50% of the image area in the recognized image area is the same as the image area included in the test sample set, and the other 50% image area is different from the image area included in the test sample set, the recognition accuracy of the image area may be determined to be 50%.

In some alternative implementations of the present embodiment, the electronic device may send a large number of recognized image areas to the terminal device, and then the user of the terminal device determines whether each image area is accurate, thereby determining the recognition accuracy of the image area.

In some alternative implementations of the present embodiment, the apparatus further includes: an adjusting unit (not shown in the figure), configured to adjust a parameter of at least one of the convolutional neural network, the classification model, the positioning model, and the keypoint model, in response to determining that the accuracy being not greater than the preset threshold.

Figure 6:
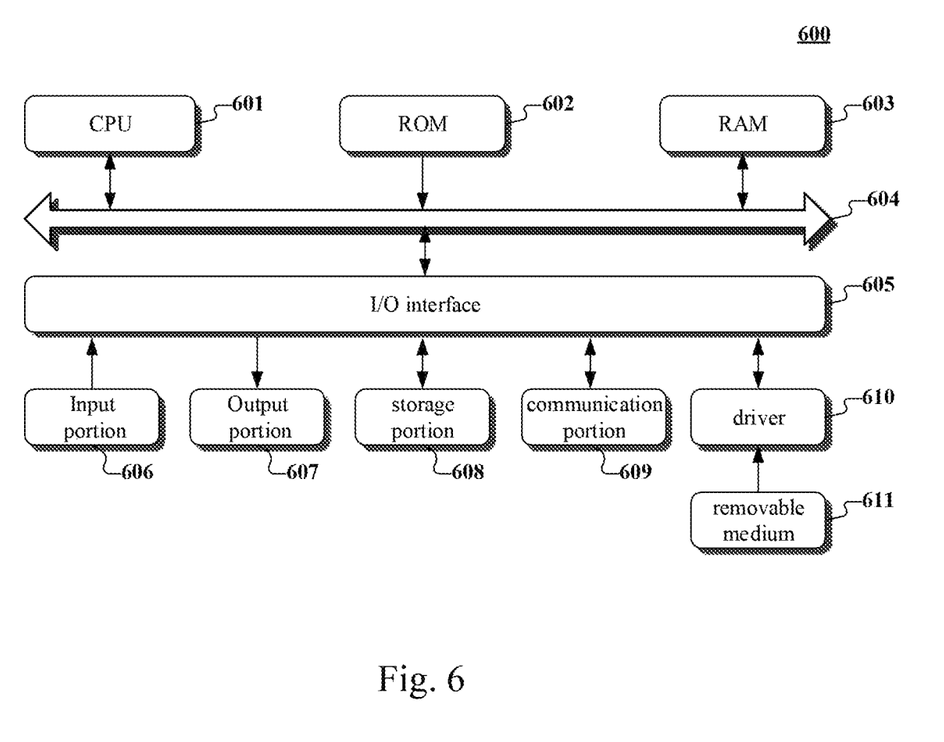
FIG. 6 is a schematic structural diagram of a computer system adapted to implement a server of the embodiments of the present disclosure.

Referring to FIG. 6, a schematic structural diagram of a computer system 600 adapted to implement a server of the embodiments of the present disclosure is shown. The server shown in FIG. 6 is only an example, and should not limit the function and the scope of the embodiments of the disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 including a cathode ray tube (CRT), a liquid crystal display device (LCD), a speaker etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including an acquisition unit, an input unit and a recognition unit, where the names of these units do not in some cases constitute a limitation to such units themselves. For example, the acquisition unit may also be described as "a unit for acquiring a target image including a polygon image."

In another aspect, the present disclosure further provides a computer-readable medium. The computer-readable medium may be the computer-readable medium included in the server in the above described embodiments, or a stand-alone computer-readable medium not assembled into the apparatus. The computer-readable medium stores one or more programs. The one or more programs, when executed by a device, cause the device to: acquire a target image comprising a polygon image; input the target image into a pre-trained convolutional neural network to obtain a characteristic vector of the target image, the convolutional neural network being used to represent a correspondence relationship between an image and a characteristic vector, and the characteristic vector being a vector including a category feature, a position feature, and a keypoint feature of the polygon image; and recognize an image area of the polygon image based on the category feature, the position feature, and the keypoint feature.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for processing an image, the method comprising:
    acquiring a target image comprising a polygon image;
    inputting the target image into a pre-trained convolutional neural network to obtain a characteristic vector of the target image, the convolutional neural network being used to represent a correspondence relationship between an image and a characteristic vector, and the characteristic vector being a vector comprising a category feature, a position feature, and a keypoint feature of the polygon image; and
    recognizing an image area of the polygon image based on the category feature, the position feature, and the keypoint feature, wherein the recognizing an image area of the polygon image based on the category feature, the position feature, and the keypoint feature, comprises:
        inputting an attribute feature into a pre-trained model to obtain an attribute of the polygon image, wherein the pre-trained model is configured to represent a correspondence relationship between the attribute feature and the attribute of the polygon image, wherein the attribute feature comprises at least one of the category feature, the position feature, or the keypoint feature, and the attribute comprises at least one of a category, a position or a keypoint,
    wherein the method is performed by a hardware processor.

2. The method according to claim 1, wherein the pre-trained model comprises a classification model, and the recognizing an image area of the polygon image based on the category feature, the position feature, and the keypoint feature, comprises:
    inputting the category feature into the classification model to obtain the category of the polygon image, wherein the classification model is used to represent the correspondence relationship between the category feature and the category of the polygon image.

3. The method according to claim 1, wherein the pre-trained model comprises a positioning model, and the recognizing an image area of the polygon image based on the category feature, the position feature, and the keypoint feature, comprises:
    inputting the position feature into the positioning model to obtain the position of the polygon image, wherein the positioning model is used to represent the correspondence relationship between the position feature and the position of the polygon image.

4. The method according to claim 1, wherein the pre-trained model comprises a keypoint model, and the recognizing an image area of the polygon image based on the category feature, the position feature, and the keypoint feature, comprises:
    inputting the keypoint feature into the keypoint model to obtain keypoint information of the polygon image, wherein the keypoint model is used to represent the correspondence relationship between the keypoint feature and the keypoint information of the polygon image.

5. The method according to claim 1, wherein the recognizing an image area of the polygon image based on the category feature, the position feature, and the keypoint feature, comprises:
    determining a predicted minimum enclosing rectangle of the polygon image included in the target image; and
    performing a sliding operation of the predicted minimum enclosing rectangle on the target image according to a preset trajectory to determine, on the target image, the image area of the polygon image matching the category feature, the position feature, and the keypoint feature.

6. The method according to claim 1, wherein the convolutional neural network is obtained by training, the training comprising:
    acquiring a training sample set, wherein a training sample comprises an image and a characteristic vector of the image; and
    using, for each training sample in the training sample set, the image included in the training sample as an input, and the characteristic vector of the image included in the training sample as an output to obtain the convolutional neural network by training using a machine learning method.

7. The method according to claim 6, wherein the method further comprises:
    determining a recognition accuracy of the image area; and
    determining the characteristic vector of the image comprising the image area and the image comprising the image area as training samples to continue training the convolutional neural network, in response to determining that the recognition accuracy being greater than a preset threshold.

8. The method according to claim 7, wherein the method further comprises:
adjusting a parameter of at least one of the convolutional neural network, the classification model, the positioning model, and the keypoint model, in response to determining that the accuracy being not greater than the preset threshold.

9. An apparatus for processing an image, the apparatus comprising:
at least one processor; and
a memory storing instructions, the instructions when executed by the at least one processor, cause the at least one processor to perform operations, the operations comprising:
acquiring a target image comprising a polygon image;
inputting the target image into a pre-trained convolutional neural network to obtain a characteristic vector of the target image, the convolutional neural network being used to represent a correspondence relationship between an image and a characteristic vector, and the characteristic vector being a vector comprising a category feature, a position feature, and a keypoint feature of the polygon image; and
recognizing an image area of the polygon image based on the category feature, the position feature, and the keypoint feature, wherein the recognizing an image area of the polygon image based on the category feature, the position feature, and the keypoint feature, comprises:
inputting an attribute feature into a pre-trained model to obtain an attribute of the polygon image, wherein the pre-trained model is configured to represent a correspondence relationship between the attribute feature and the attribute of the polygon image, wherein the attribute feature comprises at least one of the category feature, the position feature, or the keypoint feature, and the attribute comprises at least one of a category, a position or a keypoint.

10. The apparatus according to claim 9, wherein the pre-trained model comprises a classification model, and the recognizing an image area of the polygon image based on the category feature, the position feature, and the keypoint feature, comprises:
inputting the category feature into the classification model to obtain the category of the polygon image, wherein the classification model is used to represent the correspondence relationship between the category feature and the category of the polygon image.

11. The apparatus according to claim 9, wherein the pre-trained model comprises a positioning model, and the recognizing an image area of the polygon image based on the category feature, the position feature, and the keypoint feature, comprises:
inputting the position feature into the positioning model to obtain the position of the polygon image, wherein the positioning model is used to represent the correspondence relationship between the position feature and the position of the polygon image.

12. The apparatus according to claim 9, wherein the pre-trained model comprises a keypoint model, and the recognizing an image area of the polygon image based on the category feature, the position feature, and the keypoint feature, comprises:
inputting the keypoint feature into the keypoint model to obtain keypoint information of the polygon image, wherein the keypoint model is used to represent the correspondence relationship between the keypoint feature and the keypoint information of the polygon image.

13. The apparatus according to claim 9, wherein the recognizing an image area of the polygon image based on the category feature, the position feature, and the keypoint feature, comprises:
determining a predicted minimum enclosing rectangle of the polygon image included in the target image; and
performing a sliding operation of the predicted minimum enclosing rectangle on the target image according to a preset trajectory to determine, on the target image, the image area of the polygon image matching the category feature, the position feature, and the keypoint feature.

14. The apparatus according to claim 9, wherein the convolutional neural network is obtained by training, the training comprising:
acquiring a training sample set, wherein a training sample comprises an image and a characteristic vector of the image; and
using, for each training sample in the training sample set, the image included in the training sample as an input, and the characteristic vector of the image included in the training sample as an output to obtain the convolutional neural network by training using a machine learning method.

15. The apparatus according to claim 14, wherein the operations further comprise:
determining a recognition accuracy of the image area; and
determining the characteristic vector of the image comprising the image area and the image comprising the image area as training samples to continue training the convolutional neural network, in response to determining that the recognition accuracy being greater than a preset threshold.

16. The apparatus according to claim 15, wherein the operations further comprise:
adjusting a parameter of at least one of the convolutional neural network, the classification model, the positioning model, and the keypoint model, in response to determining that the accuracy being not greater than the preset threshold.

17. A non-transitory computer storage medium, storing a computer program, the computer program, when executed by a processor, causes the processor to perform operations, the operations comprising:
acquiring a target image comprising a polygon image;
inputting the target image into a pre-trained convolutional neural network to obtain a characteristic vector of the target image, the convolutional neural network being used to represent a correspondence relationship between an image and a characteristic vector, and the characteristic vector being a vector comprising a category feature, a position feature, and a keypoint feature of the polygon image; and
recognizing an image area of the polygon image based on the category feature, the position feature, and the keypoint feature, wherein the recognizing an image area of the polygon image based on the category feature, the position feature, and the keypoint feature, comprises:

inputting an attribute feature into a pre-trained model to obtain an attribute of the polygon image, wherein the pre-trained model is configured to represent a correspondence relationship between the attribute feature and the attribute of the polygon image, wherein the attribute feature comprises at least one of the category feature, the position feature, or the keypoint feature, and the attribute comprises at least one of a category, a position or a keypoint.

* * * * *